(12) United States Patent
Koumura

(10) Patent No.: US 8,587,656 B2
(45) Date of Patent: Nov. 19, 2013

(54) FACE CAMERA MOUNT STRUCTURE

(75) Inventor: Takashi Koumura, Toyota (JP)

(73) Assignee: DENSO CORPORATION, Kariya (JP)

( * ) Notice: Subject to any disclaimer, the term of this patent is extended or adjusted under 35 U.S.C. 154(b) by 1231 days.

(21) Appl. No.: 11/898,522

(22) Filed: Sep. 13, 2007

(65) Prior Publication Data

US 2008/0068462 A1 Mar. 20, 2008

(30) Foreign Application Priority Data

Sep. 19, 2006 (JP) ................................. 2006-252720

(51) Int. Cl.
*H04N 7/00* (2011.01)
*H04N 5/33* (2006.01)
*H04N 5/228* (2006.01)
*H04N 7/18* (2006.01)

(52) U.S. Cl.
USPC ........... 348/148; 348/113; 348/114; 348/115; 348/116; 348/164; 348/165; 348/166; 348/167; 348/168; 348/208.11

(58) Field of Classification Search
USPC ............. 348/113–116, 148, 164–168, 208.11
See application file for complete search history.

(56) References Cited

U.S. PATENT DOCUMENTS

| 6,703,925 | B2 | 3/2004 | Steffel | |
| 7,689,359 | B2* | 3/2010 | Tokoro et al. | 701/301 |
| 2001/0022550 | A1* | 9/2001 | Steffel | 340/426 |
| 2004/0047058 | A1 | 3/2004 | Unno et al. | |
| 2005/0226472 | A1* | 10/2005 | Komura | 382/118 |
| 2006/0202843 | A1* | 9/2006 | Ota | 340/576 |
| 2007/0115099 | A1* | 5/2007 | Hamada | 340/426.1 |
| 2007/0168128 | A1* | 7/2007 | Tokoro et al. | 701/301 |
| 2008/0048879 | A1 | 2/2008 | Lipman | |

FOREIGN PATENT DOCUMENTS

| CN | 2620880 Y | 6/2004 |
| JP | U-4-8577 | 1/1992 |
| JP | A-H06-156285 | 6/1994 |
| JP | A-06-189306 | 7/1994 |
| JP | A-11-331653 | 11/1999 |

(Continued)

OTHER PUBLICATIONS

Office Action dated Jan. 26, 2009 in corresponding German patent application No. 10 2007 043 158.0-51 (and English translation).

(Continued)

*Primary Examiner* — David Lazaro
*Assistant Examiner* — Farzana Huq
(74) *Attorney, Agent, or Firm* — Posz Law Group, PLC

(57) ABSTRACT

A face camera mount structure in a vehicle has a camera for imaging a driver's face being disposed on a reverse side of a dial at a portion that does not interfere with a speedometer design portion on the dial. A camera facing portion of the dial that faces a lens of the camera is covered with a print of a near-infrared light passing ink that selectively passes a near-infrared light. The high transparency factor of the near-infrared light through the ink makes it possible for the camera to image a sufficiently bright near-infrared light image without being recognized by a driver of the vehicle.

17 Claims, 4 Drawing Sheets

(56) References Cited

FOREIGN PATENT DOCUMENTS

| | | |
|---|---|---|
| JP | A-2000-168502 | 6/2000 |
| JP | A-2002-254956 | 9/2002 |
| JP | A-2002-316580 | 10/2002 |
| JP | A-2003-291783 | 10/2003 |
| JP | A-2004-274154 | 9/2004 |
| JP | A-2005-242428 | 9/2005 |
| JP | A-2006-096316 | 4/2006 |
| JP | A-2006-163900 | 6/2006 |

OTHER PUBLICATIONS

Office Action dated Apr. 17, 2009 in corresponding China patent application No. 200710152827.4 (and English translation).
Office Action dated Jun. 14, 2011 in corresponding JP application No. 2006-252720 (and English translation).
Court Inquiry mailed Apr. 24, 2012 in corresponding JP Application No. 2006-252720 (and English translation).
Office Action mailed Jul. 10, 2012 in corresponding JP Application No. 2006-252720 (and English translation).

* cited by examiner

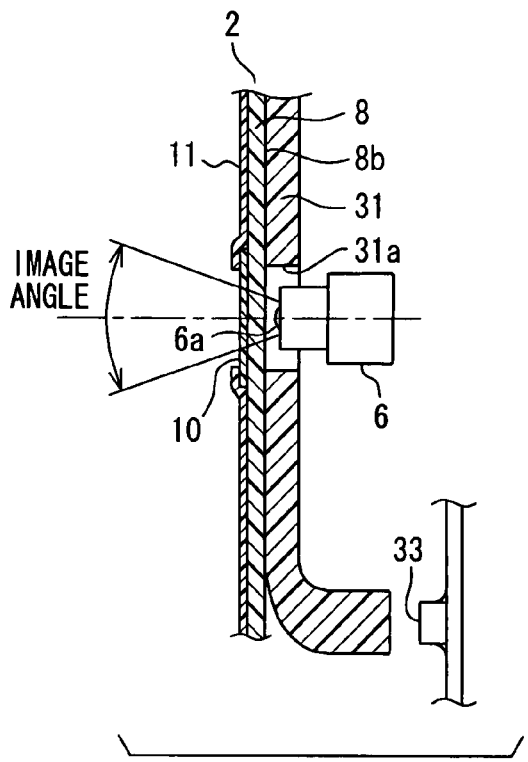
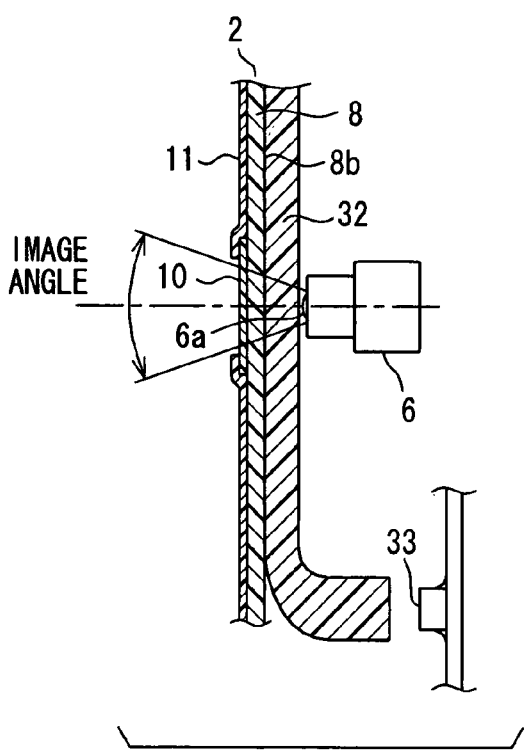

FACE CAMERA MOUNT STRUCTURE

CROSS REFERENCE TO RELATED APPLICATION

This application is based on and claims the benefit of priority of Japanese Patent Application No. 2006-252720 filed on Sep. 19, 2006, the disclosure of which is incorporated herein by reference.

FIELD OF THE DISCLOSURE

The present disclosure generally relates to a mounting structure of a camera for imaging a driver's face in a vehicle.

BACKGROUND INFORMATION

A technique for imaging a driver's face for the purpose of detecting a driver's look direction and/or blinks based on an analysis of a face image is disclosed, for example, in Japanese patent document JP-A-H11-331653. Further, a face camera for imaging the driver's face in a normal position for reading driving support information (e.g., a speed of the vehicle, a warning or the like) is disposed on a back of an instrument panel that displays the driving support information in a manner disclosed in, for example, Japanese patent document JP-A-2000-168502.

When the face camera in a meter device is recognizable by the driver of the vehicle, the notion of being watched by the camera possibly affects the driver of the vehicle negatively in a psychological sense. That is, the face camera is preferably disposed to be invisible from the driver of the vehicle. The camera in the second disclosure described above makes it difficult to recognize the camera from outside of the meter device with a half mirror interposingly disposed on a light axis of the camera.

However, the half mirror structure describe above allows about 50% of light to be passed to the camera portion due to the optical characteristics of the half mirror, thereby making it impossible to prevent the existence of the camera from being recognized from the driver of the vehicle. Further, the half mirror only allows about 50% of light to reach the camera portion disposed in an inside of the meter device, thereby making it difficult to analyze the image captured by the camera in subsequent processes.

SUMMARY OF THE DISCLOSURE

In view of the above and other problems, the present disclosure provides a face camera mount structure that prevents a face camera from being viewed by a driver of a vehicle without compromising a brightness of a face image captured by the face camera.

The camera mount structure includes a camera having a lens with sensitivity to light in a near-infrared light area for imaging a driver's face being irradiated by the light in the near-infrared light; and a meter device with a dial plate. The camera is disposed on a back side of the dial plate of the meter device without being faced with driving support information displayed on the dial plate, and a portion of the dial plate that faces the lens of the camera has a treatment that allows a near-infrared light to pass through the dial plate and prevents a visible light from passing through the dial plate, thereby enabling the camera to be hidden from a driver of the vehicle without substantially decreasing the brightness of the image of the driver's face.

BRIEF DESCRIPTION OF THE DRAWINGS

Other objects, features and advantages of the present invention will become more apparent from the following detailed description made with reference to the accompanying drawings, in which:

FIG. 4 shows a vertical cross-sectional view of a camera mount structure in a fourth embodiment of the present disclosure;

FIG. 5 shows a vertical cross-sectional view of a camera mount structure in a fifth embodiment of the present disclosure;

DETAILED DESCRIPTION

Embodiments of the present disclosure are described with reference to the accompanying drawings.

First Embodiment

Figure 1A:
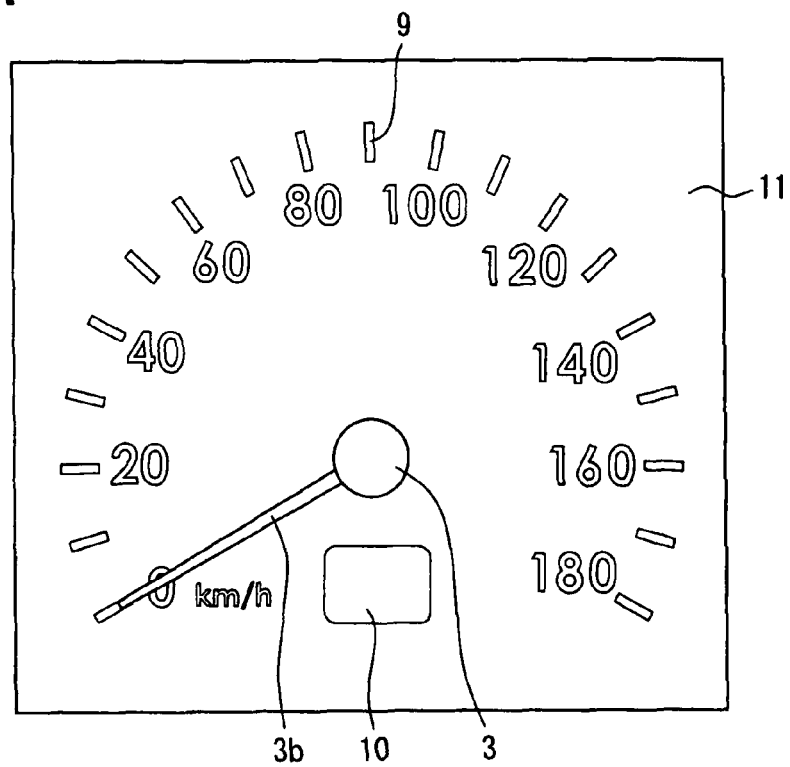
FIGS. 1A and 1B show a front view and a vertical cross-sectional view of a meter panel and a camera in a first embodiment of the present disclosure.
Figure 1B:
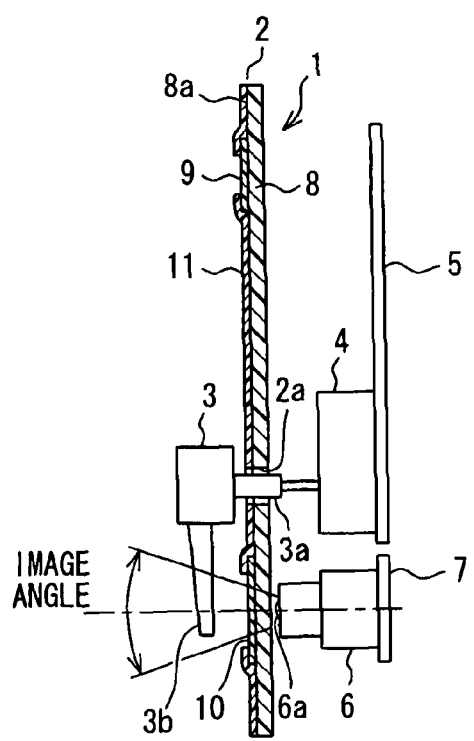

A camera mount structure of a camera for imaging a vehicle driver on a reverse side of a speedometer is described with reference to illustrations in FIGS. 1A and 1B in the following. A meter device 1 includes a dial 2, an indicator 3 of a speedometer and an indicator movement 4. The indicator 3 has an axle 3a that pierces through a hole part 2a formed in the dial 2 for a connection to the movement 4. The movement 4 is disposed on a circuit board 5 on the reverse side of (i.e., a vehicle front side) of the dial 2. In addition, on the reverse side of the dial 2 under the movement 4, there is a camera 6 having sensitiveness in a near-infrared region being disposed on a circuit board 7 that is separately disposed from the circuit board 5 mentioned above. In this case, the camera 6 has a bearing of an exposure axis adjusted to capture a driver's face who is sitting normally in a driver's seat in a predetermined capture angle.

As for the dial 2, a predetermined area on a surface 8a (i.e., an opposite surface of a surface that has the movement 4 and the camera 6 disposed thereon) of a base 8 made of a polycarbonate material has a design part (i.e., driving support information such as speed numeral, scale patterns and the like) that includes a visible light passing ink part that has a visible light passing ink 9 partially printed thereon, a near-infrared light passing ink part that has a near-infrared light passing ink 10 for selectively passing the near-infrared light partially printed thereon and a light prevent ink part that has a print of a light prevent ink 11 that covers an area of the surface 8a except for the visible light passing ink part and the near-infrared passing ink part. In other words, the camera 6 is stationed to face an area that does not interfere with the design part on the backside of the dial 2. Further, the near-infrared light passing ink 10 has characteristics of selectively passing a near-infrared light (e.g., having a wavelength of 850 [nm]-900 [nm]) without passing the visible light. In this case, the ink 10 is printed on a part that does not interfere with a pointer 3b of the indicator 3 in a view of the driver.

In the above structure, because the near-infrared light passing ink 10 is printed in an area facing the lens 6a of the camera 6, the near-infrared light irradiated on the driver's face from a light emitting device (not shown in the figure) passes through the base 8 to the camera 6 to be captured as a sufficiently bright near-infrared light image, while passing of the visible light is suppressed, thereby preventing viewing of the camera 6 by the driver's eye.

In the first embodiment, the camera 6 is disposed to face a portion of the reverse side of the dial 2 of the meter device 1 where the design part of the speedometer is not formed, with the near-infrared light passing ink 10 printed on a lens facing portion of the dial 2 that faces the lens 6a of the camera 6, thereby preventing the camera 6 from being recognized by the driver with not allowing the visible light from outside of the meter device 1, without compromising the brightness of the camera captured image of the driver's face. In addition, the surface of the dial 2 is maintained substantially as a flat surface for an improved attractiveness by printing the near-infrared light passing ink 10.

Second and Third Embodiments

A second and third embodiments of the present disclosure is described with reference to FIGS. 2 and 3. The difference of the second and third embodiments from the first embodiment is where the near-infrared light passing ink is printed.

Figure 2:
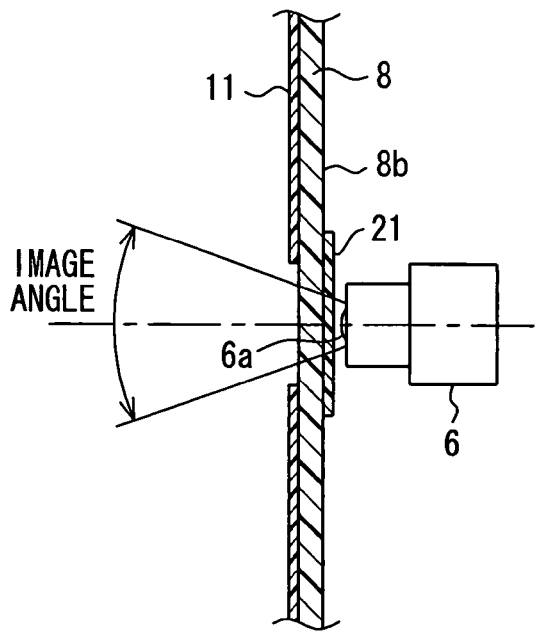
FIG. 2 shows a vertical cross-sectional view of a camera mount structure in a second embodiment of the present disclosure.
Figure 3:
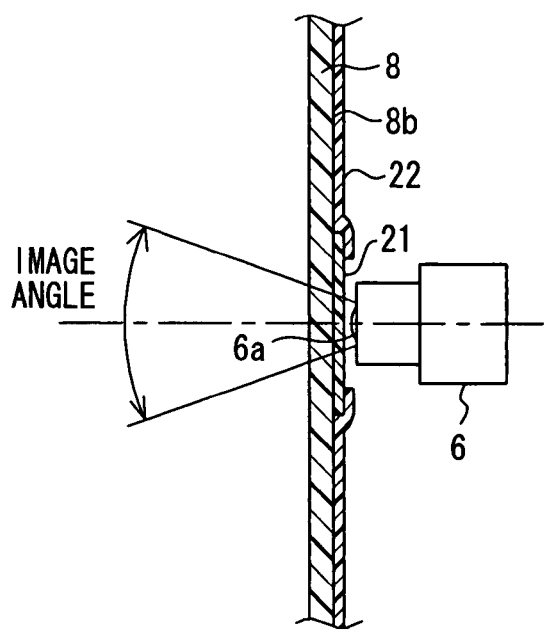
FIG. 3 shows a vertical cross-sectional view of a camera mount structure in a third embodiment of the present disclosure.

That is, the reverse side 8b of the base 8 of in a dial portion (i.e., the side that has the movement 4 and the camera 6 disposed thereon) has a near-infrared light passing ink 21 partially printed on a portion that faces the lens 6a of the camera 6 in the second embodiment as shown in FIG. 2. Further, in the third embodiment, the reverse side 8b of the base 8 of in a dial portion has the near-infrared light passing ink 21 partially printed on a portion that faces the lens 6a of the camera 6 with a rest of the reverse side 8b covered with a light prevention ink 22 printed thereon as shown in FIG. 3.

In this manner, the same effect of preventing the camera 6 from being viewed by the driver's eye without substantially compromising the brightness of the captured image of the driver's face as achieved in the first embodiment can be achieved.

Fourth and Fifth Embodiment

A fourth and fifth embodiments of the present disclosure is described with reference to FIGS. 4 and 5. The difference of the fourth and fifth embodiments from the first embodiment is an arrangement of a dial light guide for lighting the dial on the dial.

That is, in the fourth embodiment, as shown in FIG. 4, the reverse side 8b of the base 8 has a dial light guide 31 for lighting the dial made of, for example, an acrylic material disposed thereon, and a camera housing hole 31a is formed in a portion of the dial light guide 31 that opposes faces a near-infrared light passing ink part that has the near-infrared light passing ink 10 printed thereon. The camera housing hole 31 houses a part of the camera 6. In the fifth embodiment, as shown in FIG. 5, the camera 6 is disposed on the reverse side of a dial light guide 32 for lighting the dial at a portion that opposes the near-infrared light passing ink part which has the near-infrared light passing ink 10 printed thereon without having a camera housing hole in the dial light guide 32. In this case, the dial light guides 31, 32 are configured to guide the light from a visible light source 33 to be irradiated on an entire part of the dial 2.

In this manner, the same effect of preventing the camera 6 from being viewed by the driver's eye without substantially compromising the brightness of the captured image of the driver's face as achieved in the first embodiment can be achieved.

Sixth Embodiment

Figure 6:
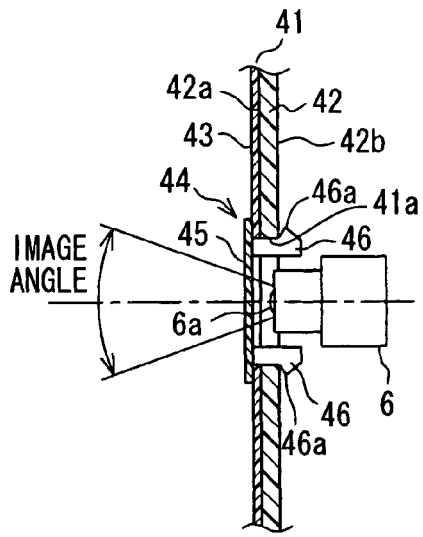
FIG. 6 shows a vertical cross-sectional view of a camera mount structure in a sixth embodiment of the present disclosure.

A sixth embodiment of the present disclosure is described with reference to FIG. 6. The difference of the sixth embodiment from the first embodiment is a replacement of a print of the near-infrared light passing ink 10 with a near-infrared light passing member 44 that selectively passes the near-infrared light therethrough.

That is, as for a dial 41, a non-permeation ink 43 is printed on a surface 42a of a base 42 having a high transmission factor, and a lens facing portion of the dial 41 has an opening 41a that faces the lens 6a of the camera 6. The near-infrared light passing member 44 is made of a resin material that passes the near-infrared light and prevents the visible light having a near-infrared light passing portion 45 and a stay 46 formed thereon. The near-infrared light passing member 44 is detachably attached on the opening 41a of the dial 41 with an engagement of a nail portion 46a of the stay 46 being fitted to a reverse surface 42b of the base 42 by elastically deforming the stay 46 (i.e., the nail 46a being snap-fitted to the base 42).

In the sixth embodiment, the near-infrared light passing member 44 is detachably attached on the lens facing portion on the dial 41, thereby enabling the same effect as in the first embodiment. That is, preventing the camera 6 from being viewed by the driver's eye without substantially compromising the brightness of the captured image of the driver's face is achieved. In addition, the near-infrared light passing member 44 is detachably attached, thereby more securely preventing the camera 6 from being viewed by the driver of the vehicle when the near-infrared light passing member 44 has a predetermined thickness.

Seventh Embodiment

Figure 7:
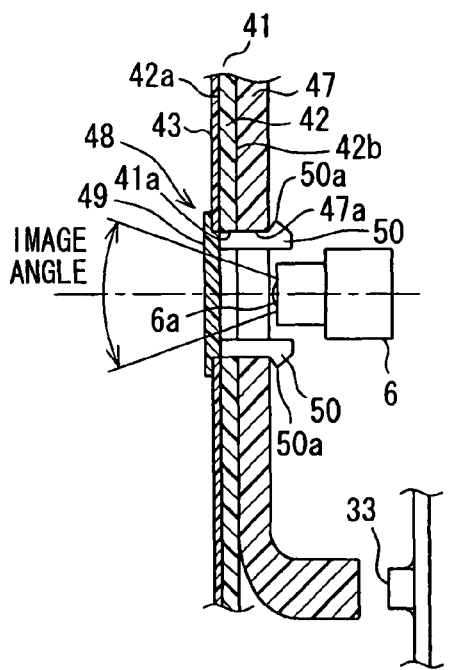
FIG. 7 shows a vertical cross-sectional view of a camera mount structure in a seventh embodiment of the present disclosure.

A seventh embodiment of the present disclosure is described with reference to FIG. 7. The difference of the seventh embodiment from the sixth embodiment is an arrangement of a dial light guide 47 for lighting the dial 41 on the dial 41.

That is, a dial light guide 47 that is made of a transparent member for lighting the dial 41 is disposed on the reverse side 42b of the base 42. A portion of the dial light guide 47 that faces the lens 6a of the camera 6 has an opening 47a in a connecting manner with the opening 41a described in he sixth embodiment. A near-infrared light passing member 48 is formed in a shape that has a near-infrared light passing portion 49 and a stay 50. The stay 50 is elastically deformed to be engaged with a reverse side 47b of the dial light guide 47 by a nail portion 50a. In this manner, the light passing member 48 is fitted in the openings 41a, 47a for being detachably disposed on the dial 41 and the dial light guide 47.

In the seventh embodiment, the same effect as the sixth embodiment is achieved. That is, preventing the camera 6 from being viewed by the driver's eye without substantially compromising the brightness of the captured image of the driver's face is achieved.

Eighth Embodiment

Figure 8:
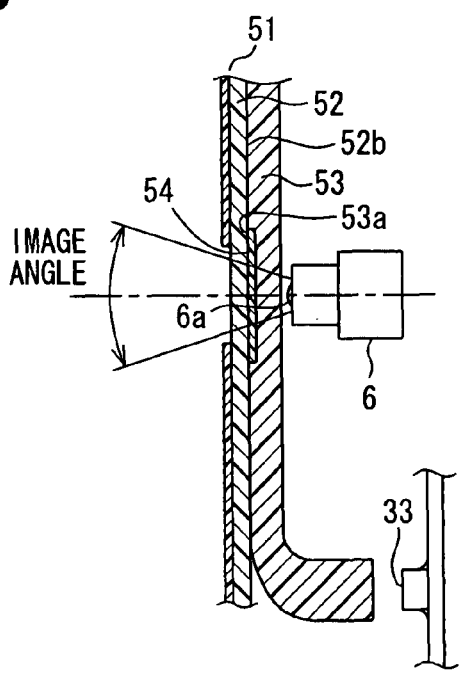
FIG. 8 shows a vertical cross-sectional view of a camera mount structure in a eighth embodiment of the present disclosure.

An eighth embodiment of the present disclosure is described with reference to FIG. 8. The difference of the eighth embodiment from the seventh embodiment is an arrangement of the near-infrared light passing member buried in the a dial light guide 47 on the dial 41.

That is, a dial light guide 53 that is made of a transparent member for lighting a dial 51 is disposed on a reverse side 52b of a base 52. Instead of providing a portion of the dial 51 that faces the lens 6a of the camera 6 with an opening, a portion of the dial light guide 53 that faces the lens 6a of the camera 6 has a buried hole 53a for having a near-infrared light passing member 54 disposed therein in a buried manner.

In the eighth embodiment, the same effect as the seventh embodiment is achieved. That is, preventing the camera 6 from being viewed by the driver's eye without substantially compromising the brightness of the captured image of the driver's face is achieved.

Other Embodiments

Although the present invention has been fully described in connection with the preferred embodiment thereof with reference to the accompanying drawings, it is to be noted that various changes and modifications will become apparent to those skilled in the art.

For example, the camera may be disposed on a reverse side of a dial of other devices such as a tachometer, a warning lamp or the like, instead of the reverse side of the speedometer.

Further, when a main part of instruments (i.e., the speedometer, the tachometer or the like) is disposed at a proximity of a center of the vehicle with the warning lamps substantially in front of the driver of the vehicle in a separate manner, the camera may be disposed on the reverse side of the dial of the warning lamps in the separate position.

Furthermore, the near-infrared light passing ink and/or the near-infrared light passing member may have characteristics of passing the light having the wavelength of 850 nanometers or higher range.

Such changes and modifications are to be understood as being within the scope of the present invention as defined by the appended claims.

What is claimed is:

1. A camera mount structure in a vehicle, comprising:
   a camera for imaging a driver's face, the camera having a lens with a sensitivity in a near-infrared light area;
   a meter device with a dial plate; and
   a pointer that is rotatable relative to the dial plate and rotatable within a rotation range, wherein
   the dial plate has speed numerals and scale patterns arranged around an axle of the pointer, the speed numerals and scale patterns being arranged in concentric arc shapes having concave sides facing downward;
   the camera is positioned on a back side of the dial plate of the meter device such that the lens of the camera is disposed on a side of the dial plate opposite the speed numerals and scale patterns, is outside of the rotation range of the pointer, is lower than the axle of the pointer, and is between lowest-most endpoints of the concentric arc shapes of the speed numerals and scale patterns; and
   a portion of a surface of a front side of the dial plate that faces the lens of the camera has a treatment that allows a near-infrared light to pass through the dial plate, but prevents a visible light from passing through the dial plate.

2. The camera mount structure of claim 1, wherein
   the portion of the surface of the front side of the dial plate that faces the lens of the camera has a light selection ink printed thereon, the light selection ink having a characteristic of allowing passing of the near-infrared light and not allowing passing of the visible light.

3. The camera mount structure of claim 1, wherein
   the portion of the surface of the front side of the dial plate that faces the lens of the camera is replaced with a detachable light selection member having a characteristic of allowing passing of the near-infrared light without and not allowing passing of the visible light.

4. A camera mount structure in a vehicle, comprising:
   a camera for imaging a driver's face, the camera having a lens with a sensitivity in a near-infrared light area;
   a meter device with a dial plate; and
   a pointer that is rotatable relative to the dial plate and rotatable within a rotation range, wherein
   the dial plate has speed numerals and scale patterns arranged around an axle of the pointer, the speed numerals and scale patterns being arranged in concentric arc shapes having concave sides facing downward;
   the camera is positioned on a back side of the dial plate of the meter device such that the lens of the camera is disposed on a side of the dial plate opposite the speed numerals and scale patterns, is outside of the rotation range of the pointer is lower than the axle of the pointer, and is between lowest-most endpoints of the concentric arc shapes of the speed numerals and scale patterns; and
   a portion of the surface of the back side of the dial plate that faces the lens of the camera has a treatment that allows a near-infrared light to pass through the dial plate, but prevents a visible light from passing through the dial plate.

5. The camera mount structure of claim 4, wherein
   the portion of the surface of the back side of the dial plate that faces the lens of the camera has a light selection ink printed thereon, the light selection ink having a characteristic of allowing passing of the near-infrared light and not allowing passing of the visible light.

6. The camera mount structure of claim 5, wherein
   the surface of a front side of the dial plate, other than a portion of the front side of the dial plate corresponding to the portion of the surface of the back side of the dial plate with the light selecting ink printed thereon, facing the lens of the camera, has a light prevention ink printed thereon.

7. The camera mount structure of claim 5, wherein
   the surface of the back side of the dial plate, other than the portion of the surface of the back side of the dial plate with the light selecting ink printed thereon, facing the lens of the camera, has a light prevention ink printed thereon.

8. The camera mount structure of claim 2, wherein
   the surface of the front side of the dial plate, other than the portion of the surface of the front side of the dial plate that faces the lens of the camera and has the light selection ink printed thereon, and other than a portion of the surface of the front side of the dial plate that has a visible light passing ink printed thereon, has a light prevention ink printed thereon.

9. The camera mount structure of claim 1, further comprising:
a dial light guide disposed on the back side of the dial plate that irradiates light on the dial plate, wherein
a camera housing hole is formed in the dial light guide corresponding to the portion of the surface of the front side of the dial plate that faces the lens of the camera; and
the camera is housed inside the camera housing.

10. The camera mount structure of claim 2, further comprising:
a dial light guide disposed on the back side of the dial plate that irradiates light on the dial plate, wherein
a camera housing hole is formed in the dial light guide corresponding to the portion of the surface of the front side of the dial plate that faces the lens of the camera; and
the camera is housed inside the camera housing.

11. The camera mount structure of claim 1, further comprising:
a dial light guide disposed on the back side of the dial plate that irradiates light on the dial plate, wherein
the camera is disposed on the back side of the dial light guide rather than the back side of the dial plate; and
the camera is disposed in the same position relative to the driving support information and the pointer.

12. The camera mount structure of claim 2, further comprising:
a dial light guide disposed on the back side of the dial plate that irradiates light on the dial plate, wherein
the camera is disposed on the back side of the dial light guide rather than the back side of the dial plate; and
the camera is disposed in the same position relative to the driving support information and the pointer.

13. The camera mount structure of claim 3, further comprising:
a dial light guide disposed on the back side of the dial plate that irradiates light on the dial plate, wherein
the camera is disposed in an opening in the dial light guide rather than the back side of the dial plate; and
the camera is disposed in the same position relative to the driving support information and the pointer.

14. The camera mount structure of claim 4, further comprising:
a dial light guide disposed on the back side of the dial plate that irradiates light on the dial plate, wherein
the camera is disposed on the back side of the dial light guide rather than the back side of the dial plate;
the camera is disposed in the same position relative to the driving support information and the pointer;
the dial light guide includes a buried hole extending away from the back side of the dial plate and located in a portion of the dial light guide that faces the lens of the camera; and
a light section member having a characteristic of allowing passing of the near-infrared light without and not allowing passing of the visible light is disposed in the buried hole.

15. The camera mount structure of claim 1, wherein
the surface of the front side of the dial plate, other than the portion of the surface of the front side of the dial plate that faces the lens of the camera and has the treatment that allows the near-infrared light to pass through the dial plate, but prevents the visible light from passing through the dial plate, and other than a portion of the surface of the front side of the dial plate that has a visible light passing ink printed thereon, has a light prevention ink printed thereon.

16. The camera mount structure of claim 4, wherein
the surface of a front side of the dial plate, other than a portion of the front side of the dial plate corresponding to the portion of the surface of the back side of the dial plate that faces the lens of the camera and has a treatment that allows a near-infrared light to pass through the dial plate, but prevents a visible light from passing through the dial plate, has a light prevention ink printed thereon.

17. The camera mount structure of claim 4, wherein
the surface of the back side of the dial plate, other than the portion of the surface of the back side of the dial plate that faces the lens of the camera and has a treatment that allows a near-infrared light to pass through the dial plate, but prevents a visible light from passing through the dial plate, has a light prevention ink printed thereon.

* * * * *